July 21, 1925.
K. T. KELLER
VALVE MANUFACTURE
Filed Jan. 10, 1921
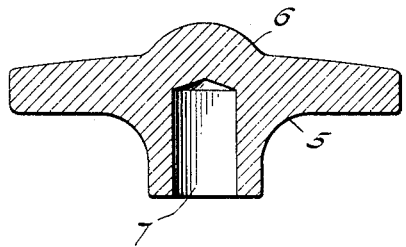
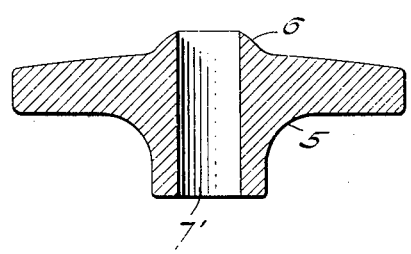
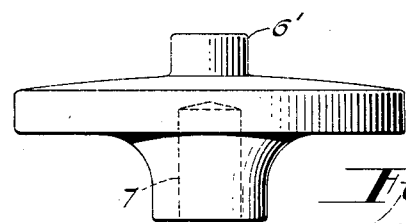
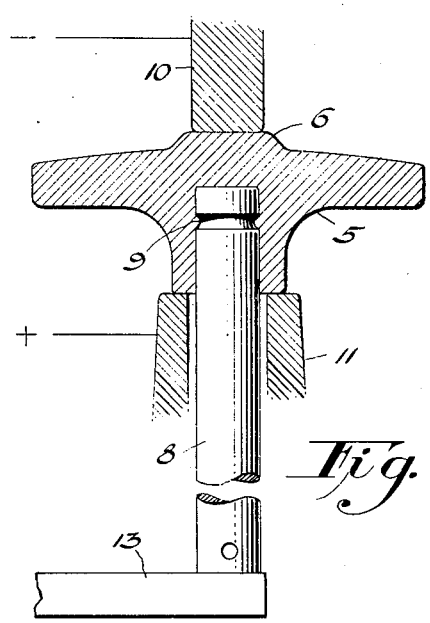
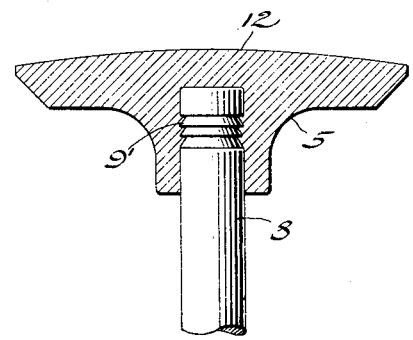

Patented July 21, 1925.  1,547,125

UNITED STATES PATENT OFFICE.

KAUFMAN T. KELLER, OF DETROIT, MICHIGAN, ASSIGNOR TO GENERAL MOTORS CORPORATION, OF DETROIT, MICHIGAN, A CORPORATION OF DELAWARE.

VALVE MANUFACTURE.

Application filed January 10, 1921. Serial No. 436,324.

*To all whom it may concern:*

Be it known that I, KAUFMAN T. KELLER, a citizen of the United States, and a resident of Detroit, county of Wayne, and State of Michigan, have invented certain new and useful Improvements in Valve Manufacture, of which the following is a full, clear, concise, and exact description, such as will enable others skilled in the art to which the invention relates to make and use the same, reference being made therein to the accompanying drawings, which form a part of this specification.

The invention relates to the manufacture of articles in which it is desirable to form a rigid and permanent connection between a rod or stem and a head or socket member, and is more particularly concerned with the manufacture of valves of the type comprising a stem of material having high tensile strength and a head of different material adapted to resist the wearing influences incident to use in connection with the cylinders of internal combustion engines.

It is customary to form the admission and exhaust valves of such engines with a cast iron head and a steel stem, but the joining of the head and stem, where these or similar metals are employed, has offered considerable difficulty. The principal object of my invention, therefore, is to provide a valve and a method of making the same, or like articles, whereby certain advantages in ease and cheapness of construction, permanence and rigidity of connection, and better wearing qualities may be secured.

In the accompanying drawings illustrative of my invention—

Fig. 1 is a sectional view of a valve head blank;

Fig. 2 is a similar view of a modified form;

Fig. 3 is an elevation of another modified form of blank;

Fig. 4 is a sectional view showing means for joining the valve head to the stem; and Fig. 5 is a cross sectional view of a portion of a completed valve.

In the practice of my invention, I prepare, by any usual casting method, a member of the desired character, as a valve head, having general outlines as shown in Fig. 1 or Fig. 2, that is, having the approximate form of a valve head as indicated at 5, but having on the upper surface thereof a boss or protuberance 6. This boss is shown in Figs. 1 and 2 as being of spherical or dome-shaped contour, but it may be varied as desired, a cylindrical form being illustrated at 6' in Fig. 3. The cast article is provided with a central or axially disposed socket 7 extending partly through the head, as shown in Fig. 1, or, if more convenient for manufacture, the socket may extend entirely through the head, as shown at 7' in Fig. 2. The socket may be formed, at least in part, in the process of casting and be completed by a boring or other finishing operation, or it may be drilled in the cast article after the casting operation is completed.

The rod or stem 8, to which the head is to be joined, is formed adjacent to one end in any desired manner to interlock with a portion of the head, preferably by the provision of an annular groove 9 as shown in Fig. 4 or a plurality of grooves, as shown at 9' in Fig. 5. The interlocking means provided should, of course, be such as will not prevent the introduction of the stem into the socket 7 or 7', which socket is preferably of uniform diameter throughout and adapted to fit closely the exterior surface of the stem. The socket 7 will be made preferably of such depth that the inner end will be somewhat below the base of the protuberance 6 so that in the finished article some thickness of the cast metal will remain above the end of the stem. In making the form illustrated in Fig. 2, the valve stem may be supported while forming the connection in such manner that the end will lie somewhat below the surface of the finished head.

The joining of the head and stem is accomplished by fusion or softening of the boss and the central portion of the head immediately above and surrounding the end of the stem sufficiently so that the fused metal will flow or may be forced into and fill the groove or grooves 9 or 9' and closely adhere to the stem. In order to produce this result I use preferably the means illustrated in Fig. 4, in which 10 indicates an upper electrode arranged to engage the boss 6 or 6', and 11 a lower electrode, preferably of annular form, arranged to engage with the lower surface of the head 5 without contacting with the stem 8. Any usual or desired means may be employed to support the electrodes and cause their movement toward and from each other. A support 13 may be employed to properly position the stem with reference to the head. If desired, the electrodes may also serve, or other suitable means may be provided, to apply pressure to the surfaces of the head and cause the plastic or fused metal to conform closely to the end of the stem. The current in passing from one electrode to the other will flow almost entirely through the head 5, thereby fusing or softening the same without materially heating the stem 8. The character of the metal in the stem will, therefore, not be greatly affected, inasmuch as it is not raised to the point of fusion by the passage of current therethrough.

The heating due to flow of current will develop most rapidly at the point of contact of the electrode with the boss, since that is the point of greatest electrical resistance. As the temperature of the boss rises and reaches the degree necessary to fuse the material of the head the area of fusion will be extended downwardly around the end of the stem. The flow of current may be discontinued before the lower portion of the head reaches a fusing temperature in order to prevent the escape of molten metal from the fused portion.

The boss or protuberance 6 or 6' provides sufficient additional metal to take the place of that which is caused to flow into the grooves and fit closely on the end of the stem. Any excess metal which remains after the joining operation has been completed will be removed in the final finishing of the valve, leaving the usual curved surface as shown at 12 in Fig. 5. Inasmuch as the end of the stem lies below the surface in the completed valve, the entire exposed upper surface of the valve consists of cast metal only and has no interruption of continuity, and the end of the stem, being buried within the metal of the head, is protected from the gases present in the engine cylinder.

It will be seen that the construction provides a very rigid and permanent connection between the valve head and stem, and that the steps involved in the process are of very simple character and the apparatus required relatively inexpensive. The electrodes used may be so constructed as to be adapted to be mounted upon a conventional spot-welding machine.

It will be understood further that various changes in details of construction and operation may be made without departing from the spirit and scope of the invention, and, therefore, I do not wish to be limited to the specific details described except as required by the language of the following claims.

I claim:

1. A method of making articles such as valves comprising the formation of a head having a socket therein extending only partially through said head, positioning the end of a stem in said socket, and fusing the portions of the head adjacent to the socket to cause the material of the head to flow and to fit closely the end of the stem, the thickness of metal at the end of the socket being such that the metal of the head in the finished valve extends over and covers the upper end of the stem.

2. A method of making articles such as valves comprising the formation of a head having a socket therein extending only partially through said head, and a boss integral with said head and located above said socket, positioning the end of a stem in said socket and fusing the portions of the head adjacent the socket to cause the material of the head to flow and to fit closely the end of the stem, the arrangement of the boss above the socket and the thickness of the metal at that point being such that the metal of the head in the finished valve extends over and covers the upper end of the stem.

3. A valve comprising a cast metal head and a stem extending only partially through said head, and held in place therein by fusing a portion of the metal at the central portion of said head and causing such fused metal to fit closely to the end of said stem.

4. A valve comprising a cast metal head and a stem extending only partially through said head and having end portions formed to interlock with the metal of the head, a portion of the head adjacent to the stem having been fused and made to fit closely to and interlock with the stem during the formation of the valve.

5. A valve having a steel stem provided with a plurality of relatively shallow and narrow annular grooves cut thereinto, and a cast iron head provided with a perforation and fitted over the annularly cut portion of the valve stem and having the metal thereof fused into the said annular grooves of the valve stem.

In testimony whereof I affix my signature.

KAUFMAN T. KELLER.